(12) United States Patent  (10) Patent No.: US 12,482,529 B2
Chou et al.  (45) Date of Patent: Nov. 25, 2025

(54) MEMORY WITH BUILT-IN SYNCHRONOUS-WRITE-THROUGH REDUNDANCY AND ASSOCIATED TEST METHOD

(71) Applicant: MEDIATEK INC., Hsin-Chu (TW)

(72) Inventors: Che-Wei Chou, Hsinchu (TW); Ya-Ting Yang, Hsinchu (TW); Shu-Lin Lai, Hsinchu (TW); Chi-Kai Hsieh, Hsinchu (TW); Yi-Ping Kuo, Hsinchu (TW); Chi-Hao Hong, Hsinchu (TW); Jia-Jing Chen, Hsinchu (TW); Yi-Te Chiu, Hsinchu (TW); Jiann-Tseng Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 118 days.

(21) Appl. No.: 18/443,347

(22) Filed: Feb. 16, 2024

(65) Prior Publication Data

US 2024/0312557 A1  Sep. 19, 2024

Related U.S. Application Data

(60) Provisional application No. 63/490,306, filed on Mar. 15, 2023.

(51) Int. Cl.
*G11C 29/02* (2006.01)
*G11C 29/12* (2006.01)

(52) U.S. Cl.
CPC .......... *G11C 29/02* (2013.01); *G11C 29/1201* (2013.01)

(58) Field of Classification Search
CPC ................ G11C 29/02; G11C 29/1201; G11C 29/56008; G11C 29/56016; G11C 29/702
See application file for complete search history.

(56) References Cited

U.S. PATENT DOCUMENTS

| 2013/0080847 A1 | 3/2013 | Zorian |
| 2019/0004915 A1* | 1/2019 | Chang ................... G11C 29/48 |
| 2020/0174909 A1 | 6/2020 | Craggs |

FOREIGN PATENT DOCUMENTS

| CN | 104102574 A | 10/2014 |
| TW | I643205 B | 12/2018 |
| TW | I689939 B | 4/2020 |

* cited by examiner

*Primary Examiner* — Jay W. Radke
(74) *Attorney, Agent, or Firm* — Winston Hsu

(57) ABSTRACT

A memory with built-in synchronous-write-through (SWT) redundancy includes a plurality of memory input/output (IO) arrays, a plurality of SWT circuits, and at least one spare SWT circuit. The at least one spare SWT circuit is used to replace at least one of the plurality of SWT circuits that is defective.

8 Claims, 4 Drawing Sheets

MEMORY WITH BUILT-IN SYNCHRONOUS-WRITE-THROUGH REDUNDANCY AND ASSOCIATED TEST METHOD

CROSS REFERENCE TO RELATED APPLICATIONS

This application claims the benefit of U.S. Provisional Application No. 63/490,306, filed on Mar. 15, 2023. The content of the application is incorporated herein by reference.

BACKGROUND

The present invention relates to a memory design, and more particularly, to a memory with built-in synchronous-write-through (SWT) redundancy and an associated test method.

Static random access memories (SRAMs) can be used as on-chip memories of a variety of chips. Hence, the yield of SRAMs dominates the overall chip yield. Currently, memory redundancy is widely used to improve the SRAM yield by replacing defective memory unit with a redundant (spare) memory unit. A chip may include a memory and complex logic circuits that are tied together via small amounts of glue logic. Traditionally, an SRAM is simply a black box during the scan test. Bypassing the SRAM during the scan test can cover the glue logic around the SRAM, thereby improving the test coverage. For example, SWT is one of the well-known bypass methods. Hence, a SWT circuit can be used to provide a bypass path for bypassing an SRAM input to an SRAM output. According to the typical test flow, the logic test (e.g., automatic test pattern generation (ATPG) test) is executed before the memory test (e.g., memory built-in self-test (MBIST)). If the SWT circuit is defective, it can be detected by the logic test, but cannot be detected by the memory test due to the fact that the memory test only tests the memory read/write function, and the SWT circuit is located at a testing path rather than a real memory read/write function path. If a die fails to pass the logic test due to the defective SWT circuit, the typical test flow regards the die as a bad die no matter whether the SRAM can pass the memory test. However, the defective SWT circuit that is designed for testing may not affect the normal SRAM function. Since it is possible that the SRAM can pass the memory test or can be repairable under a condition that the defective SWT circuit is detected by the logic test, the defective SWT circuit that does not affect the normal SRAM function overkills the SRAM yield. Thus, there is a need for an innovative memory design and test flow to improve the yield.

SUMMARY

One of the objectives of the claimed invention is to provide a memory with built-in synchronous-write-through (SWT) redundancy and an associated test method.

According to a first aspect of the present invention, an exemplary memory with built-in synchronous-write-through (SWT) redundancy is disclosed. The exemplary memory includes: a plurality of memory input/output (IO) arrays; a plurality of SWT circuits; and at least one spare SWT circuit, arranged to replace at least one of the plurality of SWT circuits that is defective.

According to a second aspect of the present invention, an exemplary method for testing a memory with built-in synchronous-write-through (SWT) redundancy is disclosed. The exemplary method includes: performing a logic test; in response to failure of the logic test, performing a fault analysis to judge whether a detected fault is at an SWT function of the memory or not; and in response to determining that the detected fault is at the SWT function of the memory, using a spare SWT circuit of the memory to replace a defective SWT circuit of the memory through soft repair.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
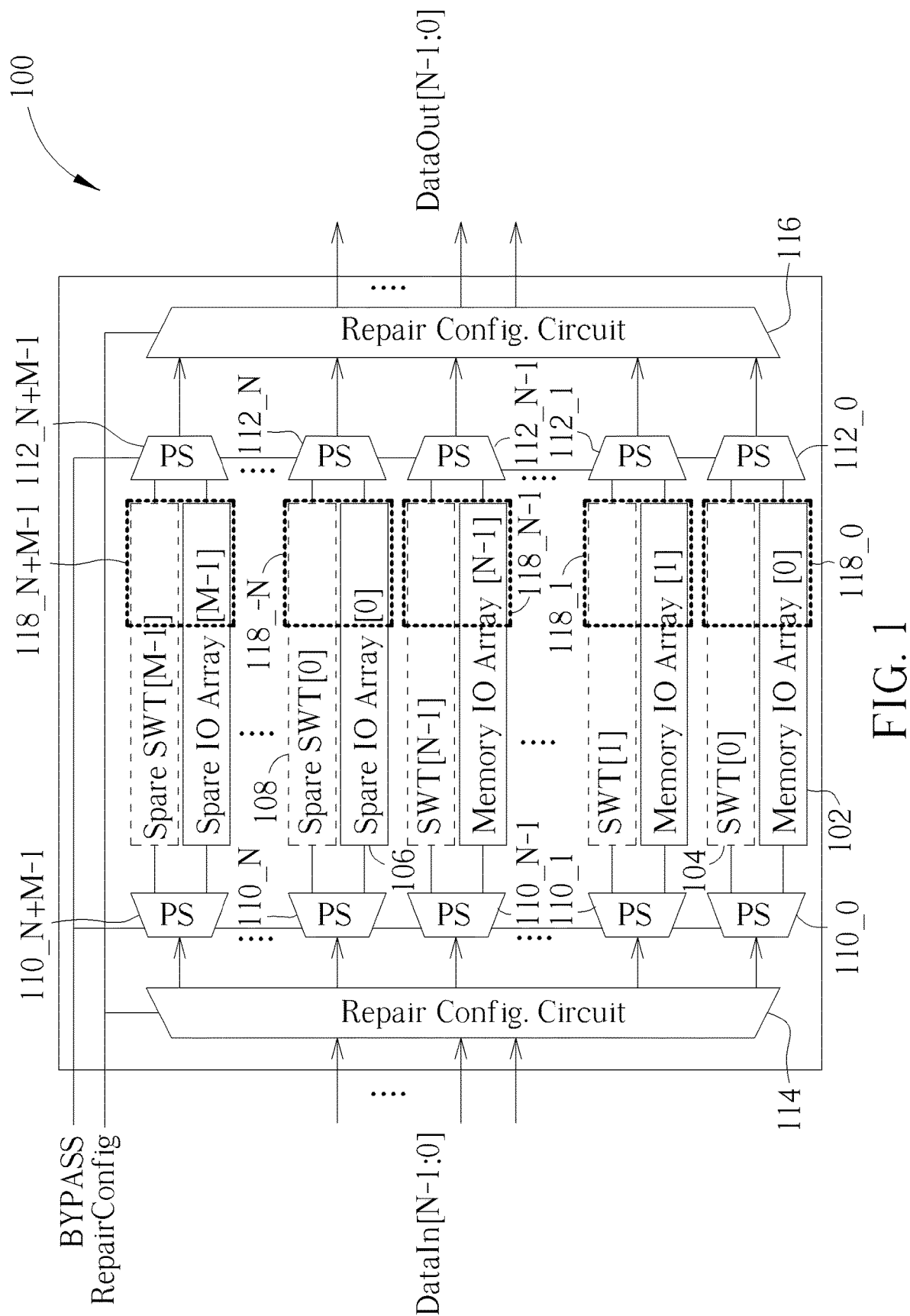
FIG. 1 is a diagram illustrating a memory with built-in SWT redundancy according to an embodiment of the present invention.

FIG. 1 is a diagram illustrating a memory with built-in SWT redundancy according to an embodiment of the present invention. By way of example, but not limitation, the memory 100 may be an on-chip memory such as an SRAM. In this embodiment, the memory 100 includes memory input/output (IO) arrays 102 (labeled by Memory IO Array [0]-Memory IO Array [N−1], where N>2), SWT circuits 104 (labeled by SWT[0]-SWT[N−1]), spare memory IO arrays 106 (labeled by Spare IO Array [0]-Spare IO Array [M−1], where M≥1) implemented for memory IO redundancy, spare SWT circuits 108 (labeled by Spare SWT[0]-Spare SWT [M−1]) implemented for SWT redundancy, path switches (labeled by "PS") 110_0-110_N+M−1, 112_0-112_N+M−1, and repair configuration circuits (labeled by "Repair Config. Circuit") 114, 116. Each of the memory IO arrays 102 may be included in a memory array, and may be in communication with a Read-Write (RW) circuit. One of the spare memory IO arrays 106 can be used to replace one of the memory IO arrays 102 that is defective. One of the spare SWT circuits 108 can be used to replace one of the SWT circuits 104 that is defective. The path switches 110_0-110_N+M−1, 112_0-112_N+M−1 are controlled by a bypass configuration BYPASS. The repair configuration circuits 114, 116 are controlled by a repair configuration Repair-Config.

For example, when a Memory IO Array [i] is defective, a Spare IO Array [j] is selected to replace the Memory IO Array [i], where 0≤i≤(N−1) and 0≤j≤(M−1). Hence, during a memory test (e.g., MBIST), the repair configuration circuit 114 receives an N-bit test input DataIn[N−1:0] and outputs the $i^{th}$ bit DataIn[i] to the path switch 110_N+j, the path switch 110_N+j receives the $i^{th}$ bit DataIn[i] and outputs the $i^{th}$ bit DataIn[i] to the Spare IO Array [j], the path switch 112_N+j receives the $i^{th}$ bit DataOut[i] from the Spare IO Array [j] and outputs the $i^{th}$ bit DataOut[i] to the repair configuration circuit 116, where an N-bit test output DataOut[N−1:0] is output from the repair configuration circuit 116.

For another example, when a SWT[i] is defective, a Spare SWT[j] is selected to replace the SWT[i], where 0≤i≤(N−1) and 0≤j≤(M−1). Hence, during a logic test (e.g., ATPG test), the repair configuration circuit 114 receives a test input DataIn[N−1:0] and outputs the $i^{th}$ bit DataIn[i] to the path switch 110_N+j, the path switch 110_N+j receives the $i^{th}$ bit DataIn[i] and outputs the $i^{th}$ bit DataIn[i] to the Spare SWT[j], the path switch 112_N+j receives the $i^{th}$ bit DataOut [i] from the Spare SWT[j] and outputs the $i^{th}$ bit DataOut[i] to the repair configuration circuit 116, where an N-bit test output DataOut[N−1:0] is output from the repair configuration circuit 116.

If the SWT circuits 104 and the spare SWT circuits 108 are individual blocks implemented in the memory 100, the area of the memory 100 is increased inevitably. The increased memory area also means that the probability of defects in the memory 100 is also increased. To address this issue, the present invention proposes a cooperate-optimized (CoOp) scheme that reuses the existing function circuit to implement the SWT circuit. Specifically, a hardware sharing technique is employed for achieving area optimization. Hence, the Memory IO Array [0] has circuit components 118_0 that are shared with SWT[0], Memory IO Array [1] has circuit components 118_0 that are shared with SWT[1], Memory IO Array [N−1] has circuit components 118_N−1 that are shared with SWT[N−1], Spare IO Array [0] has circuit components 118_N that are shared with Spare SWT [0], and Spare IO Array [M−1] has circuit components 118_N+M−1 that are shared with Spare SWT[M−1].

Figure 2:
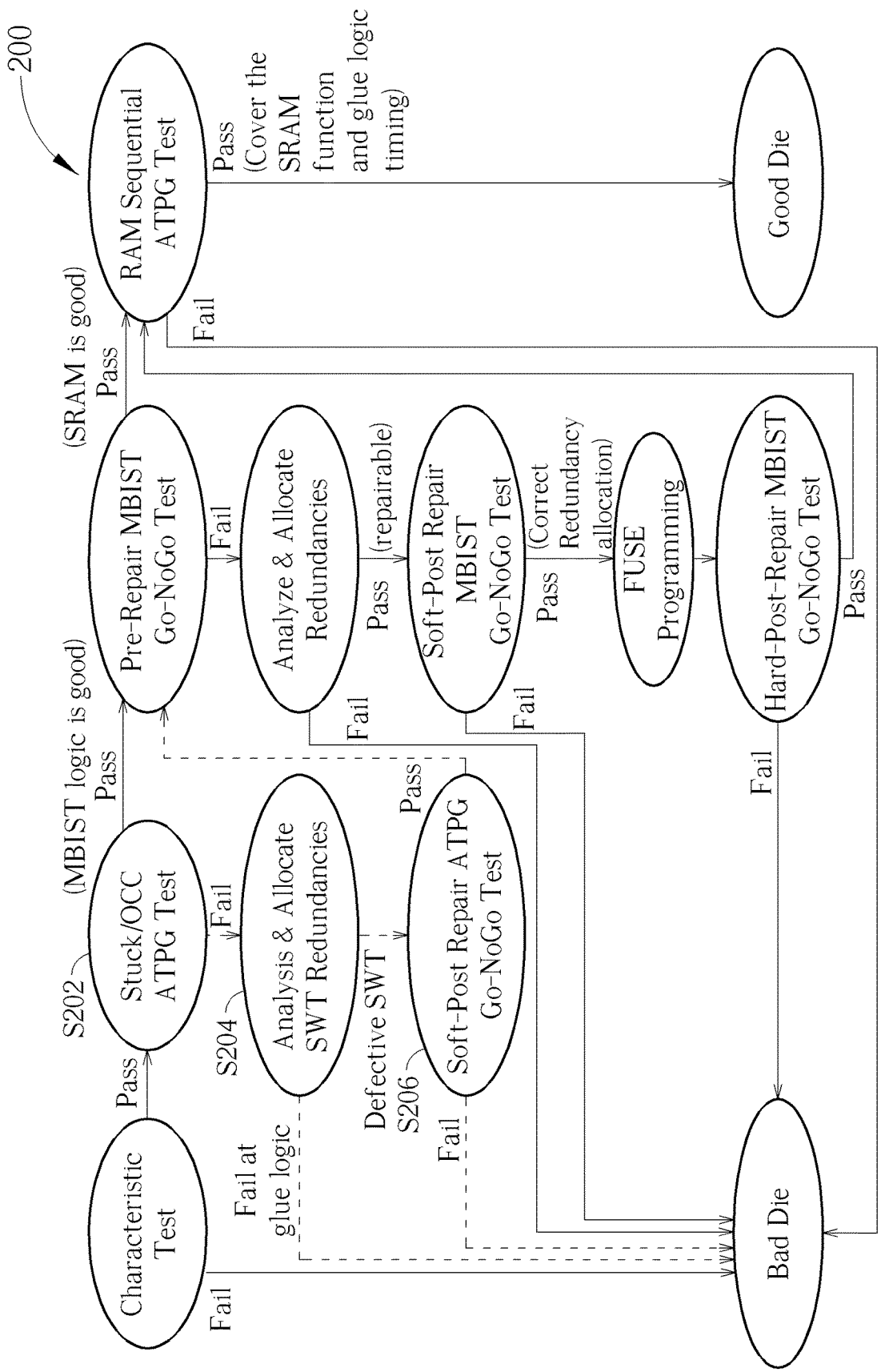
FIG. 2 is a diagram illustrating a modified test flow according to an embodiment of the present invention.

When the SRAM can pass the memory test or can be repairable by memory IO redundancy under a condition that the defective SWT circuit is detected by the logic test and can be repairable by SWT redundancy, the SRAM yield can be improved. Since the memory (e.g., SRAM) 100 employs the proposed built-in SWT redundancy, the typical test flow is modified to add extra steps in the logic test phase. FIG. 2 is a diagram illustrating a modified test flow according to an embodiment of the present invention. The proposed test flow is modified on the basis of the typical test flow. The major difference between the typical test flow and the modified test flow 200 is that the modified test flow 200 includes additional steps S204 and S206. At step 202, the logic test, such as an ATPG test that is used to test stuck-at faults by using an on-chip clock (OCC), is performed upon the memory 100. In a case where the memory 100 fails to pass the logic test (i.e., failure of the logic test occurs), step S204 is performed to do a fault analysis for judging whether a detected fault is at the SWT function of the memory 100 or not. If the fault analysis indicates that the detected fault is at the glue logic, the test flow regards a die (which includes the memory 100) as a bad die. If the fault analysis indicates that the detected fault is at the SWT function of the memory 100, a spare SWT circuit of the memory 100 is selected to replace a defective SWT circuit of the memory 100 through soft repair (step S204). Compared to hard repair that store the SWT repair configuration in a non-volatile way such as an electronic fuse (eFuse), the soft repair stores the SWT repair configuration in a volatile memory such as a buffer or a register. At step S206, the logic test is performed upon the memory 100 again after the spare SWT circuit replaces the defective SWT circuit through soft repair. If the memory 100 still fails to pass the logic test after SWT soft repair, the test flow regards a die (which includes the memory 100) as a bad die. If the memory 100 successfully passes the logic test after SWT soft repair, the test flow proceeds with the follow-up memory test (e.g., MBIST). As a person skilled in the pertinent art can readily understand details of other steps that are also included in the typical test flow, further description is omitted here for brevity.

Figure 3:
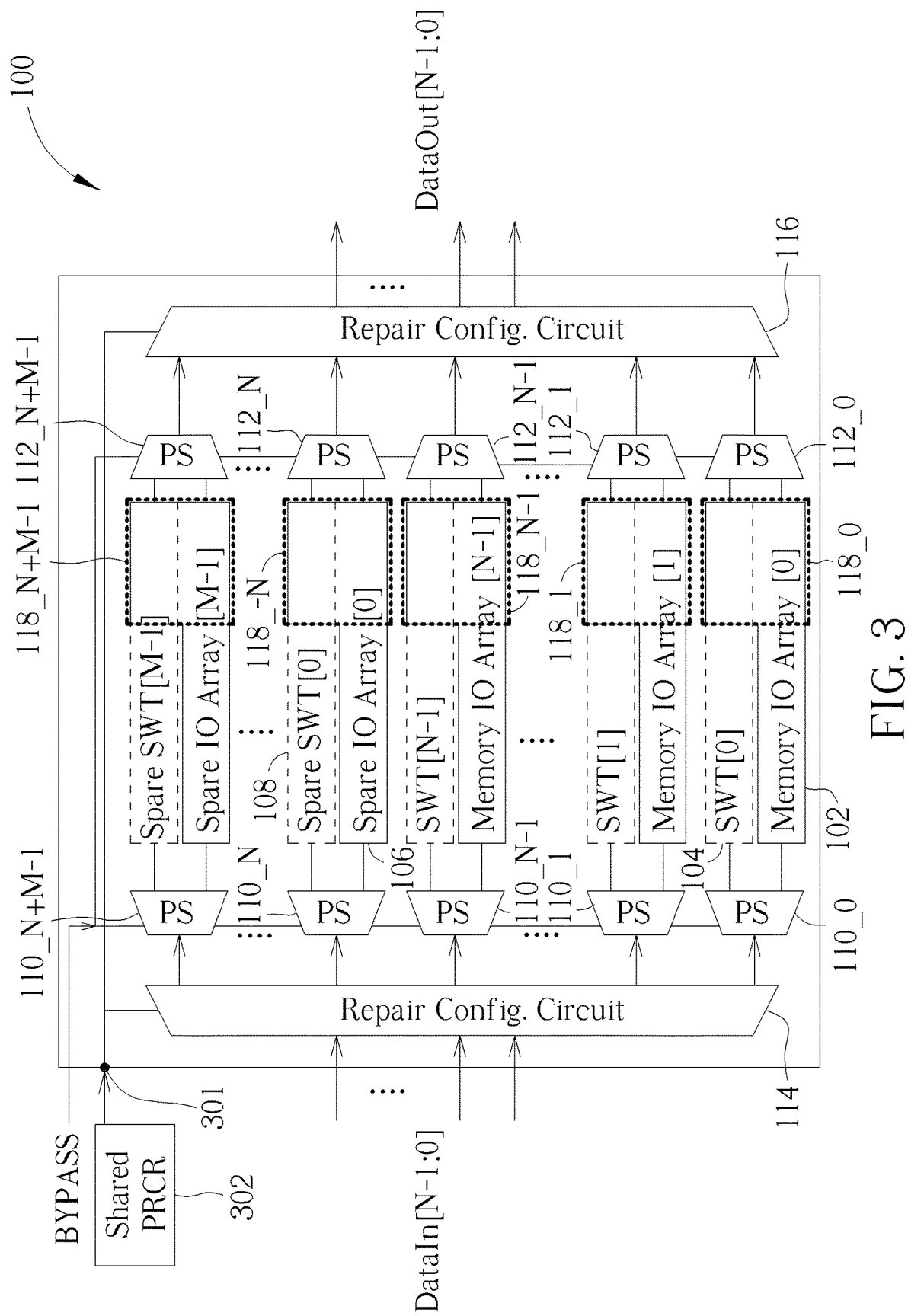
FIG. 3 is a diagram illustrating a memory with built-in SWT redundancy that obtains a memory IO repair configuration and an SWT repair configuration from a shared programmable repair configuration register according to an embodiment of the present invention.

As mentioned above, one of the spare memory IO arrays 106 can be used to replace one of the memory IO arrays 102 that is defective, and one of the spare SWT circuits 108 can be used to replace one of the SWT circuits 104 that is defective. The mapping between memory IO array (s) and spare memory IO array (s) depends on a memory IO repair configuration set by soft repair and/or hard repair. In addition, the mapping between SWT circuit (s) and spare SWT circuit (s) depends on an SWT repair configuration set by soft repair. In one exemplary design, the memory IO repair configuration and the SWT repair configuration may be written into a same repair configuration register in a time-division manner. FIG. 3 is a diagram illustrating a memory with built-in SWT redundancy that obtains a memory IO repair configuration and an SWT repair configuration from a shared programmable repair configuration register (SPRCR) according to an embodiment of the present invention. In this embodiment, the memory 100 is arranged to have a configuration port 301 that is coupled to an SPRCR 302. In a logic test phase, the SPRCR 302 is used to provide an SWT repair configuration to the repair configuration circuits 114, 116 via the configuration port 301, to allocate a spare SWT circuit for a defective SWT circuit. In a memory test phase following the logic test phase, the SPRCR 302 is reused to provide a memory IO repair configuration to the repair configuration circuits 114, 116 via the configuration port 301, to allocate a spare memory IO array for a defective memory IO array.

Figure 4:
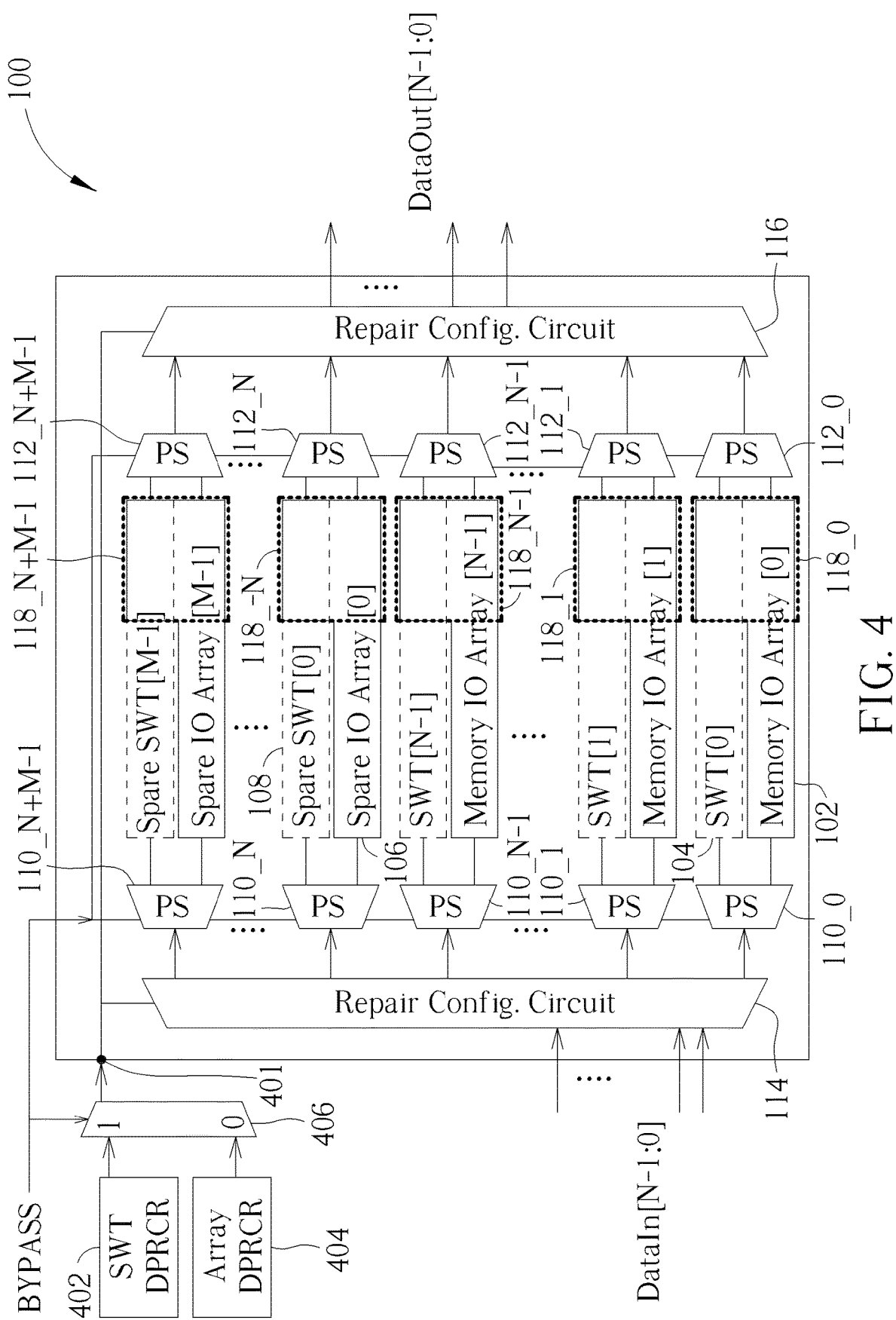
FIG. 4 is a diagram illustrating a memory with built-in SWT redundancy that obtains a memory IO repair configuration and an SWT repair configuration from dedicated programmable repair configuration registers according to an embodiment of the present invention.

In another exemplary design, the memory IO repair configuration and the SWT repair configuration may be written into two repair configuration registers, respectively. FIG. 4 is a diagram illustrating a memory with built-in SWT redundancy that obtains a memory IO repair configuration and an SWT repair configuration from dedicated programmable repair configuration registers (DPRCR) according to an embodiment of the present invention. In this embodiment, the memory 100 is arranged to have a configuration port 401 that is coupled to an SWT DPRCR 402 and an array DPRCR 404 through a multiplexer 406. In a logic test phase, the SWT DPRCR 402 is used to provide an SWT repair configuration to the repair configuration circuits 114, 116 via multiplexer 406 and configuration port 401, to allocate a spare SWT circuit for a defective SWT circuit. In a memory test phase following the logic test phase, the array DPRCR 404 is used to provide a memory IO repair configuration to the repair configuration circuits 114, 116 via multiplexer 406 and configuration port 401, to allocate a spare memory IO array for a defective memory IO array.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A memory with built-in synchronous-write-through (SWT) redundancy, comprising:
    a plurality of memory input/output (IO) arrays;
    a plurality of SWT circuits; and
    at least one spare SWT circuit, arranged to replace at least one of the plurality of SWT circuits that is defective.

2. The memory of claim 1, further comprising:
    at least one spare memory IO array, arranged to replace at least one of the plurality of memory IO arrays that is defective;
    wherein the at least one spare memory IO array comprises circuit components that are shared with the at least one spare SWT circuits.

3. The memory of claim 1, wherein one of the plurality of memory IO arrays comprises circuit components that are shared with one of the plurality of SWT circuits.

4. The memory of claim 1, wherein when a logic test fails at a defective SWT circuit, a spare SWT circuit replaces the defective SWT circuit through soft repair.

5. The memory of claim 1, wherein the memory further comprises:
    a configuration port, coupled to a shared programmable repair configuration register (SPRCR);
    wherein in a logic test phase, the SPRCR is used for allocating a spare SWT circuit for a defective SWT circuit; and in a memory test phase, the SPRCR is reused for allocating a spare memory IO array for a defective memory IO array.

6. The memory of claim 1, wherein the memory further comprises:
    a configuration port, coupled to a first dedicated programmable repair configuration register (DPRCR) and a second DPRCR through a multiplexer;
    wherein in a logic test phase, the first DPRCR is used for allocating a spare SWT circuit for a defective SWT circuit; and in a memory test phase, the second DPRCR is used for allocating a spare memory IO array for a defective memory IO array.

7. A method for testing a memory with built-in synchronous-write-through (SWT) redundancy, comprising:
    performing a logic test;
    in response to failure of the logic test, performing a fault analysis to judge whether a detected fault is at an SWT function of the memory or not; and
    in response to determining that the detected fault is at the SWT function of the memory, using a spare SWT circuit of the memory to replace a defective SWT circuit of the memory through soft repair.

8. The method of claim 7, further comprising:
    after the spare SWT circuit replaces the defective SWT circuit through soft repair, performing the logic test again.

* * * * *